Nov. 18, 1958 L. S. STOGSDILL 2,860,411
HAND SCRAPER
Filed May 11, 1955

INVENTOR
LEE S. STOGSDILL
BY Gravely Lieder, Woodruff & Wills
ATTORNEYS.

2,860,411
HAND SCRAPER

Lee S. Stogsdill, Webster Groves, Mo.

Application May 11, 1955, Serial No. 507,616

3 Claims. (Cl. 30—171)

This invention relates to improvements in hand scrapers, and an important object is to provide a scraper having improved scraper blade mounting means adapted to increase the strength of the scraper and permit the use of interchangeable blades.

A further object of this invention is to provide a scraper blade mounting which will overcome scraper blade chatter and vibration, and improve the stability of the blade.

Another object hereof is to provide a scraper whose handle is so related with the position of the scraping blade that changes in the scraping angle of the blade with the work can be made with a minimum of change in the grasp on the handle.

A preferred embodiment of this scraper consists in a scraper blade mounting adapted to receive scraper blades and hold the same in such a way as to avoid chatter and vibration. The invention also consists in improvements in the form and construction of the blade mounting so that maximum blade stability is provided for a replaceable type scraper blade. The invention further consists in a scraper having a handle of such form as to improve the manipulation thereof and obtain advantages heretofore not realized.

The invention also consists in the parts and elements which will be particularly described in connection with the accompanying drawings wherein.

Figure 1:
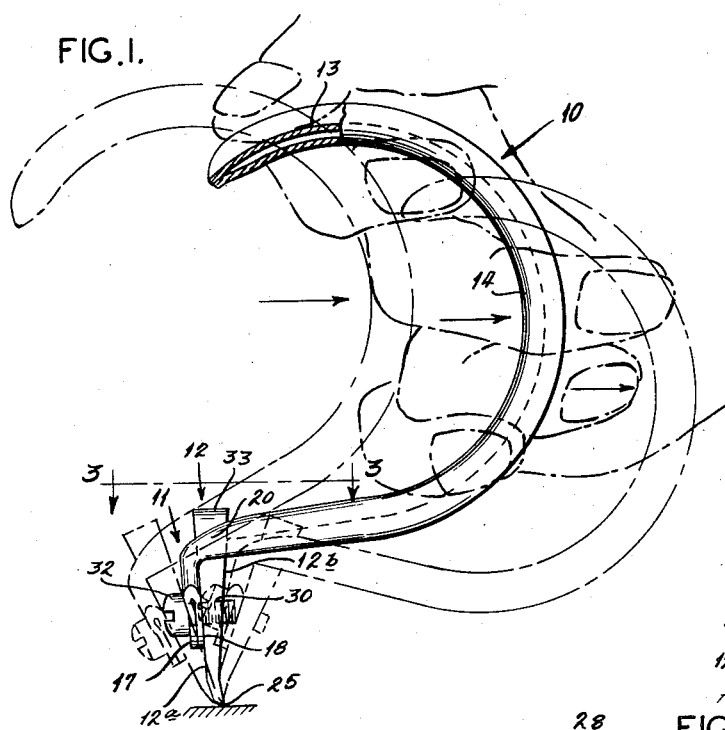
Fig. 1 is a side elevational view of the improved scraper, including in phantom outline two different scraping positions.

Referring now to the drawings in detail, a form of the present hand scraper is shown in Figs. 1 to 4 inclusive. The hand scraper as shown includes a handle 10, a scraper blade mounting 11, and a scraper blade 12.

The over-all handle 10, as seen in Fig. 1 is substantially semi-circular in shape and is formed from tubular stock which has had its opposite walls 13 and 14 deformed or pressed together so that the walls abut one another and form a shallow C or bow-shaped handle cross section. Viewed externally the outer handle wall or surface 13 appears concave and in abutting relation with the inner handle wall or surface 14 which is convex. The curved or semicircular side view of the handle 10 and the convexity of the inner handle wall 14 provide convenient and comfortable means for gripping the scraper. Fig. 1 shows in phantom a typical right handed grip on the scraper handle 10. The bowed shape of the double thickness form provides rigid support for the handle 10 that permits great force to be applied against the scraper blade 12.

Figure 4:
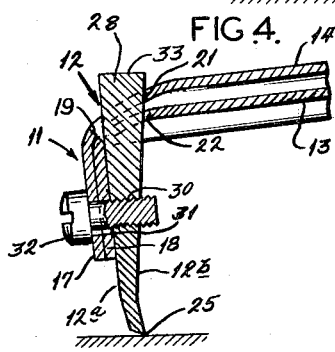
Fig. 4 is a sectional elevational view of the scraper blade and mounting therefor, as seen along line 4—4 in Fig. 3.

The blade mounting 11 is shown integral with the handle 10, and comprises a blade backing tab 17 formed of flattened portions of the walls 13 and 14 of the tubular stock. The flattened backing tab 17 is bent or angularly deformed relative to one end of the handle 10 and forms a blade abutment surface 18 that engages one surface of the scraper blade 12. The tab 17 is shown in Figs. 1 and 4 as a wall which is substantially perpendicular to the lower portion of the handle walls 13 and 14. The mounting 11 also includes an opening 19 defined on two sides by rib members 20 which are extensions of the handle 10. The rib members 20 connect the handle 10 with the abutment surface 18 and form the sides of the opening 19. The abutment surface 18 and the end of the handle 10 nearest thereto define the remaining sides of the opening 19. The end of the handle 10 that defines one surface of the opening 19 includes two substantially abutting faces 21 and 22 which are shown (Fig. 4) offset vertically from the upper end of the abutment surface 18. The faces 21 and 22 are the terminal ends of the handle walls 14 and 13 respectively, and provide fulcrum surfaces against which the scraper blade 12 coacts.

Figure 2:
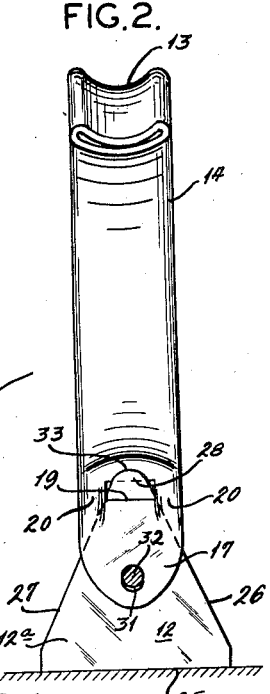
Fig. 2 is a front elevational view of the scraper shown in full line in Fig. 1.
Figure 3:
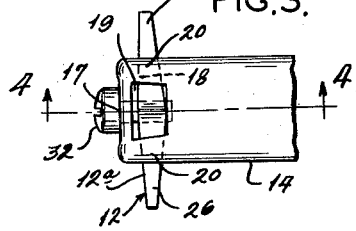
Fig. 3 is a top fragmentary view of the scraper as seen in full line and along line 3—3 in Fig. 1.
Figure 5:
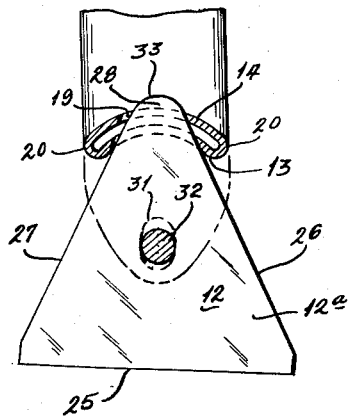
Fig. 5 is a fragmentary front view of the scraper blade when adjusted into an angular position.

The scraper blade 12, as shown in Figs. 2 and 5, has a triangular shape in which a scraping edge 25 forms one side or leg thereof and the other two sides or legs are indicated by the numbers 26 and 27. The legs 26 and 27 converge upwardly from the scraper edge 25 to a crown or apex 28. The crown portion 28 of the scraper blade 12 is thicker (as appears in Fig. 4) than the remainder of the triangularly shaped blade 12 so that in side view (Figs. 1 and 4) the blade is also generally triangular in shape having its thickest portion at the crown 28 and being angled slightly to the rear near the scraping edge 25 to provide a suitable average angle of engagement for the scraping edge 25 with the work to be scraped.

The scraper blade 12 is fastened to the blade mounting 11 by inserting the crown 28 of the blade into the opening 19 with most of the blade 12 extending downwardly therefrom. The opening 19 is so made that when the crown 28 is inserted the front surface 12a of the blade 12 abuts the surface 18 and the rear surface 12b of the blade loosely abuts one or both of the fulcrum faces 21 and 22. In this position an aperture 30 in the blade 12 is in alignment with a cooperating slotted aperture 31 in the blade backup tab 17. Suitable means such as a screw 32 is inserted through the aperture 31 and threadedly engaged with the aperture 30 in the blade 12. When threadedly or otherwise fastened to the backing tab 17, the blade 12 will be secured in abutting relation with the surface 18 and will have its upper portion forced against the upper one of the fulcrum faces 21 and 22.

The face 18 of the tab 17 is usually flat but the plane of this surface is not parallel to the plane in which the faces 21 and 22 are located. If these two planes are considered, it is intended that they diverge downwardly (toward the work) a few degrees so that element 32 can draw the blade up and hold it cocked against one of the faces 21 and 22. The downwardly diverging anglar relation of the face plane 18 and the plane defined by the edge faces 21 and 22 is apparent in view of the gap or space formed between the face edge 22 and the adjacent surface of the blade 12 to the left thereof. In Fig. 4 the screw element 32 is shown as having drawn the body of the blade 12 into abutment with surface 18 of the tab 17, and in so doing the blade 12 is angularly cocked in the slot or opening 19 so that it is held near the top in abutment with the edge face 21. This cocking of the blade 12 produces a gap at the front of the opening 19 as clearly shown in Fig. 3. Thus, the angular divergence of the two planes above referred to is demonstrated, and the beneficial result is that the blade 12 is firmly secured with a pressure exerted at the edge face 21 and surface contact on face 18 of the tab 17.

In operating condition with the scraper blade 12 in the mounting 11, the crown 28 of the blade 12 extends through the top of the opening 19. A rounded anvil surface 33 defines the upper surface of the blade 12 providing an accessible surface that may be struck by a hammer or like instrument if desirable in a particular application to mark a work surface or cut off unusually stubborn material.

The scraper, shown in Fig. 1, is readily manipulated by grasping the handle 10 in either hand, and by applying such downward and rightward pulling force as is necessary to obtain the scraping action desired at edge 25, also as shown, the hand can very readily be shifted along the semi-circular handle to allow the pull to be parallel to the surface being worked for positive and negative angular positions of the scraper blade 12.

In Fig. 5 is shown adjustment of the scraper which permits the operator to change the angular relation between the scraping edge 25 and the attitude of handle 10. To accomplish this either the opening 19 in the mounting 11 must be widened transversely or the aperture 3 in the tab 17 must be made at a lower position, or both must be done so that when the securing means 32 is loosened the blade 12 may be pivoted about said securing means 32 to any desired angle. If the handle 10 is pulled in an horizontal upright direction with the blade 12 tilted in the mounting, greater force will be concentrated on the lower portion of the scraping edge 25 thus enabling the operator to perform a beveling operation or to scrape along a slanted surface without having to change the angle of the handle 10.

The described hand scraper is an important improvement over scrapers heretofore known to the art. The present scraper greatly facilitates the mounting of interchangeable scraping blades and the simplified mounting means herein shown is easy to operate, using only a conventional screw driver. Because of the simplicity of design and the reduced number of parts, the present scraper has a novel advantage of greatly reducing the chatter and vibration normally incident to scrapers. It is a recognized fact that chatter or vibration in a scraping instrument produces an undesirable marking effect on the surface being scraped which effect is greatly reduced by the present scraper.

While the foregoing description has necessarily been confined to certain preferred embodiments of the invention, it is understood that restrictions are not to be construed except as may be required by the scope of the appended claims. To simplify the description the various members have been discussed with the scraper in the upright position. However, no limitation is intended or should be inferred therefrom to limit use of the scraper to the upright position.

The particular form of the invention shown in the accompanying drawing and described hereinabove is for illustrative purposes only and is intended to cover all changes thereof that do not depart from the spirit of the invention.

What I claim is:

1. In a hand operated scraper device the improvement which comprises blade mounting means, a scraper blade attached to said mounting means to avoid chatter and vibration, and a handle connected to said mounting means and having a long gripping surface to allow angular manipulation of the blade by shifting the surface through the hand of the user; said mounting means including a blade abutment having an aperture therein near one end and a slot opening adjacent its opposite end, side members extending from said abutment and forming the lateral limits of said slot, said slot having a fulcrum surface between said side members, and threaded attachment means disposed in said aperture; said blade having a scraping edge, a crown end, and a threaded aperture in said blade to receive said attachment means, the attachment means rigidly holding said blade against said abutment with its said crown end inserted in said slot between said side members and against said fulcrum surface; and said handle including a body portion connected to said side members of the blade mounting means, and a portion circularly curved along the lengthwise axis thereof extending upwardly from said body portion and forming said long gripping surface for manually grasping the scraper at different places on its circlar length to have the hand pull substantially parallel to the surface to be scraped and for shifting the grasp along the length thereof to maintain the same relative grasp, while effecting tilting of the blade selectively between positive and negative angles, whereby a scraping pull on said blade through said handle can be maintained parallel to the surface to be scraped.

2. The scraper device set forth in claim 1, wherein said handle is a flattened tubular member with a convex surface at the inside of the circular curvature and a concave opposite surface, whereby great strength is obtained for manipulating said blade in use.

3. The scraper device set forth in claim 1, wherein said mounting means for said blade has the plane of said fulcrum surface and the plane of said abutment angularly related to diverge toward the surface to be scraped, whereby said scraper blade is forced against said fulcrum by tightening said threaded attachment means to draw said scaper blade against said abutment.

References Cited in the file of this patent

UNITED STATES PATENTS

| | | |
|---|---|---|
| 822,928 | Delano | June 12, 1906 |
| 1,383,873 | Stine | July 5, 1921 |
| 1,768,537 | Alexander | July 1, 1930 |
| 1,994,417 | Lee | Mar. 12, 1935 |
| 2,061,669 | Orman | Nov. 24, 1936 |
| 2,259,662 | Roberts | Oct. 21, 1941 |
| 2,325,219 | Bingley | July 27, 1943 |